US008078350B2

(12) United States Patent
Coulmeau

(10) Patent No.: US 8,078,350 B2
(45) Date of Patent: Dec. 13, 2011

(54) AUTONOMOUS FLIGHT METHOD

(75) Inventor: François Coulmeau, Seilh (FR)

(73) Assignee: Thales (FR)

( * ) Notice: Subject to any disclaimer, the term of this patent is extended or adjusted under 35 U.S.C. 154(b) by 820 days.

(21) Appl. No.: 12/160,796

(22) PCT Filed: Feb. 8, 2007

(86) PCT No.: PCT/EP2007/051199
§ 371 (c)(1),
(2), (4) Date: Jul. 14, 2008

(87) PCT Pub. No.: WO2007/090860
PCT Pub. Date: Aug. 16, 2007

(65) Prior Publication Data
US 2011/0196564 A1 Aug. 11, 2011

(30) Foreign Application Priority Data
Feb. 10, 2006 (FR) ..................................... 06 01204

(51) Int. Cl.
*G01C 22/00* (2006.01)

(52) U.S. Cl. ........................................................ 701/26

(58) Field of Classification Search ................ 701/3-12, 701/14-18, 24-26; 244/75.1, 76 R, 76 A-76 C, 244/76 J, 79-82, 174-191
See application file for complete search history.

(56) References Cited

U.S. PATENT DOCUMENTS 6,181,987 B1 * 1/2001 Deker et al. ..................... 701/3
6,641,087 B1 * 11/2003 Nelson ....................... 244/118.5
6,739,556 B1 * 5/2004 Langston ..................... 244/189
6,965,816 B2 * 11/2005 Walker ........................... 701/16
6,975,923 B2 * 12/2005 Spriggs ......................... 700/245
7,006,904 B2 * 2/2006 Pippenger ......................... 701/3
7,120,521 B2 * 10/2006 Lilley ................................ 701/3
7,183,946 B2 * 2/2007 Boudrieau .................... 340/945
2003/0055540 A1 * 3/2003 Hansen ............................ 701/3
2003/0093187 A1 * 5/2003 Walker ............................. 701/1
2003/0144769 A1 * 7/2003 Meier .............................. 701/3
2003/0201365 A1 * 10/2003 Nelson ....................... 244/118.5
2004/0107028 A1 6/2004 Catalano
2004/0217232 A1 * 11/2004 Yount et al. ................. 244/76 R
2005/0216138 A1 9/2005 Turung

FOREIGN PATENT DOCUMENTS

WO WO2004025600 3/2004

* cited by examiner

*Primary Examiner* — Khoi Tran
*Assistant Examiner* — Harry Oh
(74) *Attorney, Agent, or Firm* — Lowe Hauptman Ham & Berner, LLP

(57) ABSTRACT

The method relates to autonomous flights performed by aircraft without the assistance of an aircrew and without said flights having been scheduled during mission preparation. It comprises negotiation with an air traffic control authority, of the modifications made to the flight plan so as to integrate these autonomous flights into the existing air traffic with minimum disturbance.

10 Claims, 3 Drawing Sheets

AUTONOMOUS FLIGHT METHOD

CROSS-REFERENCE TO RELATED APPLICATIONS

The present Application is based on International Application No. PCT/EP2007/051199, filed on Feb. 8, 2007, which in turn corresponds to French Application No. 0601204, filed on Feb. 10, 2006, and priority is hereby claimed under 35 USC §119 based on these applications. Each of these applications are hereby incorporated by reference in their entirety into the present application.

FIELD OF THE INVENTION

The present invention relates to autonomous flights performed by aircraft without the assistance of an aircrew and without said flights having been scheduled during mission preparation.

BACKGROUND OF THE INVENTION

Autonomous flights may be encountered in various circumstances such as for example, when an aircraft suffering from a failure of its aircrew is placed under the command of an automaton or of a remote authority situated on the ground or in another aircraft, with a view to bringing it back to the ground under the best safety conditions both as regards the occupants of the aircraft and the residents of the zones overflown or else when a drone returns prematurely to its base after a break in its command link with the ground.

Since it became apparent that a civilian aircraft could be hijacked to serve as a weapon of destruction, emphasis has been placed on systems and methods making it possible to bring an aircraft back to the ground without the assistance of its crew while as far as possible minimizing the risks incurred by the residents of the regions overflown and by the occupants of the aircraft. All the known systems and methods propose that control of the aircraft be taken over, after detecting a crew failure situation, by an automatic onboard facility which takes charge of the flight controls while dispossessing the crew thereof, either to follow in an emergency a predefined flight plan, selected, from among a set of flight plans stored in a database, as being that whose route is the closest to the current position of the aircraft, or to give command of the aircraft to a ground station or to another aircraft ensuring direct piloting or providing a flight plan to be followed in an emergency. A few known systems and methods make provision to warn aircraft deploying in the vicinity and the air traffic control centers, of the emergency situation facing the aircraft onboard which they are carried, but none of them concern themselves with the proper insertion into the air traffic of the new flight plan adopted as an emergency so that the air traffic control authorities are compelled to organize an evacuation of the airspace in a wide vicinity around an aircraft in an emergency situation so as to avoid any risk of collision.

The same necessity to evacuate the airspace and to stop all air traffic in the vicinity of an aircraft arises when the aircraft is a drone which, for one reason or another, is no longer commanded from the ground and follows, in an autonomous manner, a return flight plan to its base.

SUMMARY OF THE INVENTION

The aim of the present invention is to solve the problem of inserting, into pre-existing air traffic, an aircraft following, under more or less complete autonomy, a flight plan modified part whose insertion into the air traffic could not be scheduled during mission preparation.

Its subject is an autonomous flight method for aircraft consisting, for an onboard automaton having taken command of the flight controls with a view to a rerouting, in:

- formulating a proposal for flight plan modifications to be performed autonomously for the rerouting, from a so-called diversion waypoint marking a position reached in the flight plan currently in progress after an arbitrary period reserved for negotiation with an air traffic control authority in the region overflown,
- negotiating by telecommunication the proposal for flight plan modifications with the control authority,
- in case of absence of flight plan modifications returned by the control authority in the negotiation period, implementing in an autonomous manner the proposal for flight plan modifications,
  - in case of flight plan modifications returned by the control authority
  - if the flight plan modifications returned are identical to the proposal for flight plan modifications, implementing them in an autonomous manner,
  - if the flight plan modifications returned differ from the proposal for flight plan modifications, analyzing their consistency as regards the rules defining an onboard strategy,
  - if the flight plan modifications returned are consistent with the rules defining the onboard strategy, implementing them in an autonomous manner in place of the proposal for flight plan modifications,
  - if the flight plan modifications returned exhibit inconsistencies with respect to the rules defining the onboard strategy, making a new proposal for flight plan modifications which take into account the elements of the flight plan modifications returned which satisfy the rules defining the onboard strategy, and undertaking a new negotiation,
  - as soon as the negotiation period has elapsed, implementing in an autonomous manner the latest proposal made onboard for flight plan modifications.

Advantageously, the method furthermore comprises an intermediate step consisting, in case of absence of flight plan modifications returned by a control authority or disagreement persisting after the period of negotiation with the control authority, in placing the aircraft on a standby airfield and in seeking, during an arbitrary period to make oneself reliant on a guardian, aircraft or ground station approved for this kind of guardianship.

Advantageously, when the flight plan modifications are aimed at a landing on a rerouting airport, the proposal for flight plan modifications made by the automaton consists, after having determined the rerouting airport and the approach procedure to be followed so as to land on one of its landing runways, in supplementing the series of waypoints associated with flight constraints of the approach procedure with one or more joining segments starting from the diversion waypoint crossed under the local conditions of the flight plan in force so as to reach the first waypoint of the approach procedure while complying with the locally imposed flight constraints.

Advantageously, when the control authority proposes a rerouting airport and the approach procedure for reaching it, the automaton adopts them as airport to be reached and approach procedure to be followed.

Advantageously, when the control authority proposes several rerouting airports and approach procedures, the automaton selects an airport and an approach procedure from among the rerouting airports and approach procedures proposed by the control authority based on its own criteria relating to the aircraft, to the airports and to the flight conditions.

Advantageously, when the control authority does not propose any rerouting airports, the automaton selects an airport and an approach procedure from among rerouting airports and approach procedures catalogued in a database on the basis of its own criteria relating to the aircraft, to the airports and to the flight conditions and which, in respect of the airports, rely on information stored in the database.

Advantageously, the segment or segments joining the first waypoint of an approach procedure are composed of an ARINC 424 segment of XF type making it possible to reach the access point while complying with optional local heading or route constraints, supplemented with an ARINC 424 segment of HM type, for airfield, with the number of laps necessary in order to dissipate the energy while cutting the altitude.

Advantageously, the negotiation with the control authority involves an authentication procedure guaranteeing that the flight plan modifications returned originate from an air traffic control center.

Advantageously, figuring among the rules defining the onboard strategy is the necessity for the flight plan modifications returned during negotiation, by a control authority to satisfy:

- the possibility for the automaton to follow the corresponding route while complying with imposed maneuverability limitations of the aircraft,
- the selection of a non-prohibited landing runway and of a valid approach procedure,
- compliance with the safety altitudes throughout the journey to be traveled,
- compliance with a minimum length compatible with the necessary adjustment of the kinetic and potential energies at the access point of a landing field approach procedure,
- compliance with a maximum length compatible with the fuel consumption and the travel time, and
- the selection of all the landing aid means available on the chosen landing runway.

Advantageously, among the limitations imposed on the maneuverability of the aircraft figuring in the rules defining the onboard strategy, some relate to vertical and lateral accelerations below the detectability threshold of human beings.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

a FIG. 1 is a diagram illustrating the relations with its environment onboard an aircraft, of a return to ground automaton implementing the method according to the invention, a FIG. 2 is a chart illustrating the operative modes of an exemplary return to ground automaton implementing the method according to the invention, and a FIG. 3 is a chart illustrating the steps of a process for selecting a suitable rerouting airport and approach procedure by a return to ground automaton implementing the method according to the invention.

DETAILED DESCRIPTION OF THE INVENTION

Figure 1:
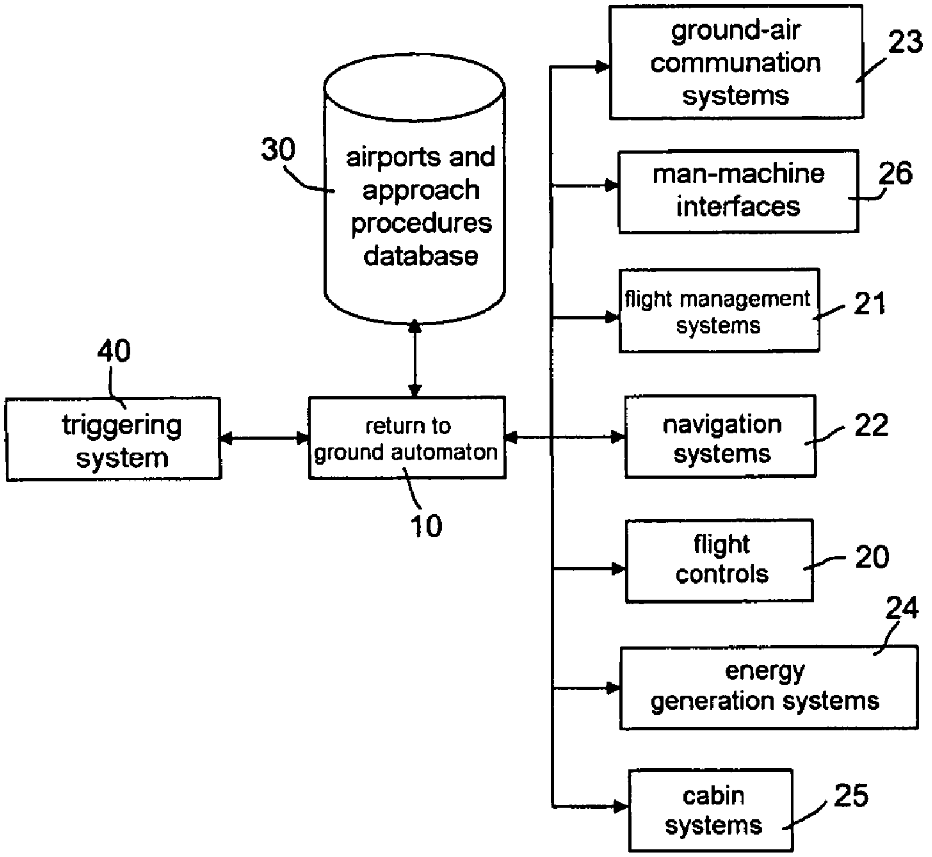

As shown in FIG. 1, the return to ground automaton 10 is in contact with the main flight equipment of an aircraft, namely the flight controls 20, the automatic flight management systems AFS 21 (FMS flight management computer and automatic pilot PA), the navigation systems 22, the ground-air communication systems 23, the energy generation systems 24, the cabin systems 25 and the man-machine interfaces 26 giving the crew mastery of the flight equipment. It uses the services of an airports and approach procedures database 30 and is activated by a triggering system 40.

The airports and approach procedures database 30 is a navigation database cataloguing the navigation information customarily used by the FMS flight management computer 21 and which also serves the return to ground automaton 10 and rerouting information more specially intended for the return to ground automaton 10.

The navigation information relates to the published navigation procedures concerning the customary zone of deployment of the aircraft, the airports liable to be used by the aircraft (geographical locations, orientations and lengths of the runways, navigation aids, radio frequencies of the local weather information centers, radio frequencies and procedures for contacting the competent regional air traffic control centers, etc.).

The rerouting information is specific for each catalogued airport and relates to their availability for an emergency landing, the medical and policing means available on the ground, etc., the availability possibly being conditional and may depend on the type of threat prompting activation of the triggering device 40.

The triggering system 40 can consist of a simple set of actuation buttons distributed in the aircraft, at the disposal of the members of the crew or be more elaborate and include in addition to buttons actuatable by the crew, an automatic item of equipment for monitoring the situation onboard termed EASS discerning, in an automatic manner, without the assistance of the crew, as a function of a certain number of criteria, various types of unusual situations onboard where it can be strongly presumed that the crew is unable to conduct the aircraft safely and soundly, such as for example, a hijacking in midair by passengers with hostile intentions, a loss of consciousness of the crew as a consequence of an air-conditioning fault or the like, etc.

The EASS equipment can be an expert system relying on a database of facts and knowledge, as well as on an inference engine, to diagnose, through a series of logical deductions, various types of unusual situations onboard that justify relieving the crew of the command of the aircraft, such as for example, abnormal behavior of the aircraft or of its main equipment without detection or signaling of faults, taking hostage of the crew by passengers who have invaded the cockpit, a cockpit environment that has become hostile as a consequence of faults, fires or destruction of equipment, chemical or bacteriological attack, or else, bomb or missile attack, etc., and, optionally, decide a mode of operation of the return to ground automaton 10, suited to the unusual situation detected onboard.

When it is triggered as a consequence of an action of the crew or the detection of a situation onboard, with a strong suspicion that the crew is unable to continue the flight, the triggering system 40 freezes the man-machine interfaces 26 or, when concealment turns out to be necessary, makes them display a more or less complex imaginary fault of the flight controls 20 and activates the return to ground automaton 10 which takes sole command of all the flight equipment.

The activation of the return to ground automaton 10 is done according to a mode of operation which is dependent on the urgency of the return to ground and the risk incurred at ground level estimated according to the discerned type of unavailability situation of the crew in progress, identified either by the button actuated, or by the EASS equipment if it is present and which is chosen by the triggering system 40 from three possible ones:

- a mode of formulating the modifications of the flight plan for the return to the ground according to pre-established rules involving a negotiation with an ATC air traffic control authority and of automatic tracking of the modified flight plan, this mode being appropriate in the absence of proven urgency of return to the ground and of a significant risk incurred at ground level,
- a mode of placing under the guardianship of a master aircraft or of an air traffic control authority taking charge of the modifications of the flight plan for the return to the ground, this mode being appropriate in the absence of proven urgency and when absence of significant risk incurred at ground level cannot be guaranteed, and
- a mode of formulating the modifications of the flight plan for the return to the ground according to pre-established rules but without negotiation with an ATC air traffic control authority and of automatic tracking of the modified flight plan, this mode being appropriate in case of proven urgency and of absence of significant risk incurred on the ground.

When the triggering system 40 detects a presumed situation of crew unavailability, it can, while activating the return to ground automaton 10 according to one of its modes of operation, provide it with, in the form of situation parameters, details on the presumed situation of crew unavailability so that it takes account thereof during the formulation of the modifications of the flight plan with a view to returning to the ground.

Figure 2:
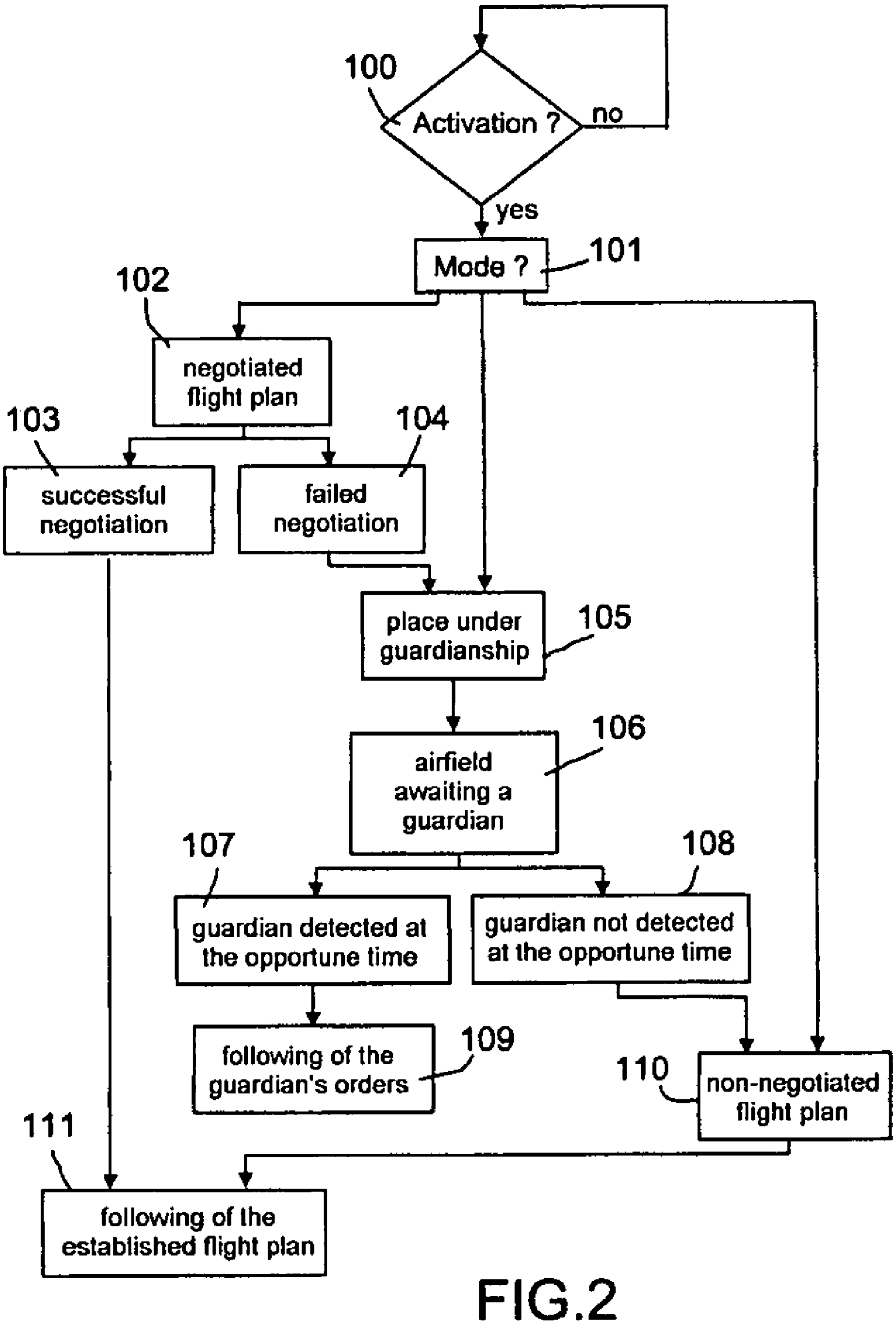

As shown by the operating chart represented in FIG. 2, the return to ground automaton 10 is kept on standby (situation 100) so long as it is not called on by the triggering system 40.

When the return to ground automaton 10 is activated at 100, 101 by the triggering system 40 in its mode of negotiated modification of the flight plan, it formulates at 102 modifications of the flight plan for an automatic return to the ground, the terms of which it negotiates with an air traffic control authority.

If the negotiation reaches an agreement at 103, the negotiated modifications of the flight plan, that are approved by the ATC air traffic control authority, are implemented at 111, in an automatic manner up to landing.

If for one reason or another, the negotiation fails at 104, the return to ground automaton 10 places the flight plan modifications in memory in the state they had when the negotiation broke down and passes at 105 to the mode of operation of placing under guardianship.

When the return to ground automaton 10 is activated in its mode of operation of placing under guardianship 105, either directly at 100, 101 by the triggering system 40 or indirectly at 104 subsequent to a negotiation failure, it engages at 106, the aircraft on a standby airfield defined with respect to a fixed point and tracked by means of the onboard navigation systems 22 relying on radio-navigation ground beacons (VOR-DME or TACAN) and/or on a constellation of positioning satellites (GPS) while seeking, through a specific and secure procedure, to contact a guardian that may be another aircraft or an air traffic ground control station that are approved for this kind of guardianship.

If within a certain period, a guardian appears and responds to the calls of the return to ground automaton 10 (situation 107), the return to ground automaton 10 follows the instructions of the guardian for its return to the ground (situation 109).

If after a certain period, the return to ground automaton 10 does not succeed in contacting a guardian (situation 108) or if it loses contact with its guardian, it passes at 110 to its mode of operation for formulating the modifications of the flight plan without negotiation.

When the return to ground automaton 10 is activated in its mode of operation for formulating the modifications of the flight plan without negotiation 110, either directly at 100, 101 by the triggering system 40 or indirectly at 108 subsequent to a failure to make contact or a loss of contact with a guardian, it determines the modifications of the flight plan if it has not already done so subsequent to an aborted negotiation with an air traffic control authority, and implements them in an automatic manner, up to landing.

If the return to ground automaton 10 loses contact with the master aircraft, it passes to the mode of operation for formulating the modifications of the flight plan without negotiation, determines the modifications of the flight plan and implements them at 111, in an automatic manner, up to landing.

When the return to ground automaton 10 is activated in its modes of operation for formulating the negotiated or non-negotiated modifications of the flight plan, it begins with the determination of the rerouting airport and of a published approach procedure leading to a landing runway of this airport before formulating a trajectory allowing the aircraft to join the trajectory counseled by the approach procedure selected while complying with the flight constraints thereof.

When it is induced to determine the rerouting airport by itself, the return to ground automaton 10 makes its choice from among the airports catalogued in the airports and approach procedures database 30, as a function of its own criteria:

- airplane criteria involving the capabilities of the aircraft relating, notably, to the length of runway that it requires and to the types of radioelectric approach and guidance procedures for precision landing such as ILS (acronym of the expression Instrument Landing System), MLS (acronym of the expression: "Microwave Landing System), DGPS (acronym of the expression: "Differential Ground Positioning System), etc., suited to it,
- airport criteria involving the administrative features of the airports, notably the opening hours, the runways in service as well as the medical and policing means, and the environmental features of the airports, notably their distance from a town center, the surrounding population density and the weather,
- flight condition criteria, notably maneuverability of the aircraft, remaining capacity, flight time, significance of the local traffic and relief overflown and optionally, detectability thresholds for human detection of vertical and lateral accelerations.

It also takes account of the situation parameters provided by the EASS situation monitoring equipment when the triggering system 40 is provided therewith.

The consideration in the flight condition criteria, of the detectability thresholds for human detection of vertical and lateral accelerations goes in the same direction as the displaying of false faults on the man-machine interfaces 26. It makes it possible, when it turns out to be necessary, to conceal from the occupants of the aircraft, the taking of command thereof by the return to ground automaton 10 by obliging it to limit itself to weak hardly discernable vertical and lateral accelerations.

To allow the implementation of these criteria, the airports and approach procedures database 30 comprises, for each airport, in addition to its aeronautical characteristics:

an indication indicating whether or not an emergency landing is appropriate with, optionally, preference levels, and in the case where an airport is appropriate for an emergency landing details on the distance from the town center, the surrounding population density, the medical, policing, military means that can be mobilized as well as the decontamination means available, and details on the behavior to be followed: parking area to be reached, swiftness of the landing, landing on a platform of a non-aeronautical character, blind obedience to the request of the airport authority, etc.

The database and approach procedures 30 can be updated before each takeoff as a function of the scheduled mission, for example by digital data link, via the D-ATIS service (acronym of the expression: "Digital Automated Terminal Information Service") provided for in ATN (acronym of the expression: "Aeronautical Telecommunications Network") or ACARS (acronym of the expression: "Aircraft Communications Addressing and Reporting System") aeronautical telecommunication networks.

Figure 3:
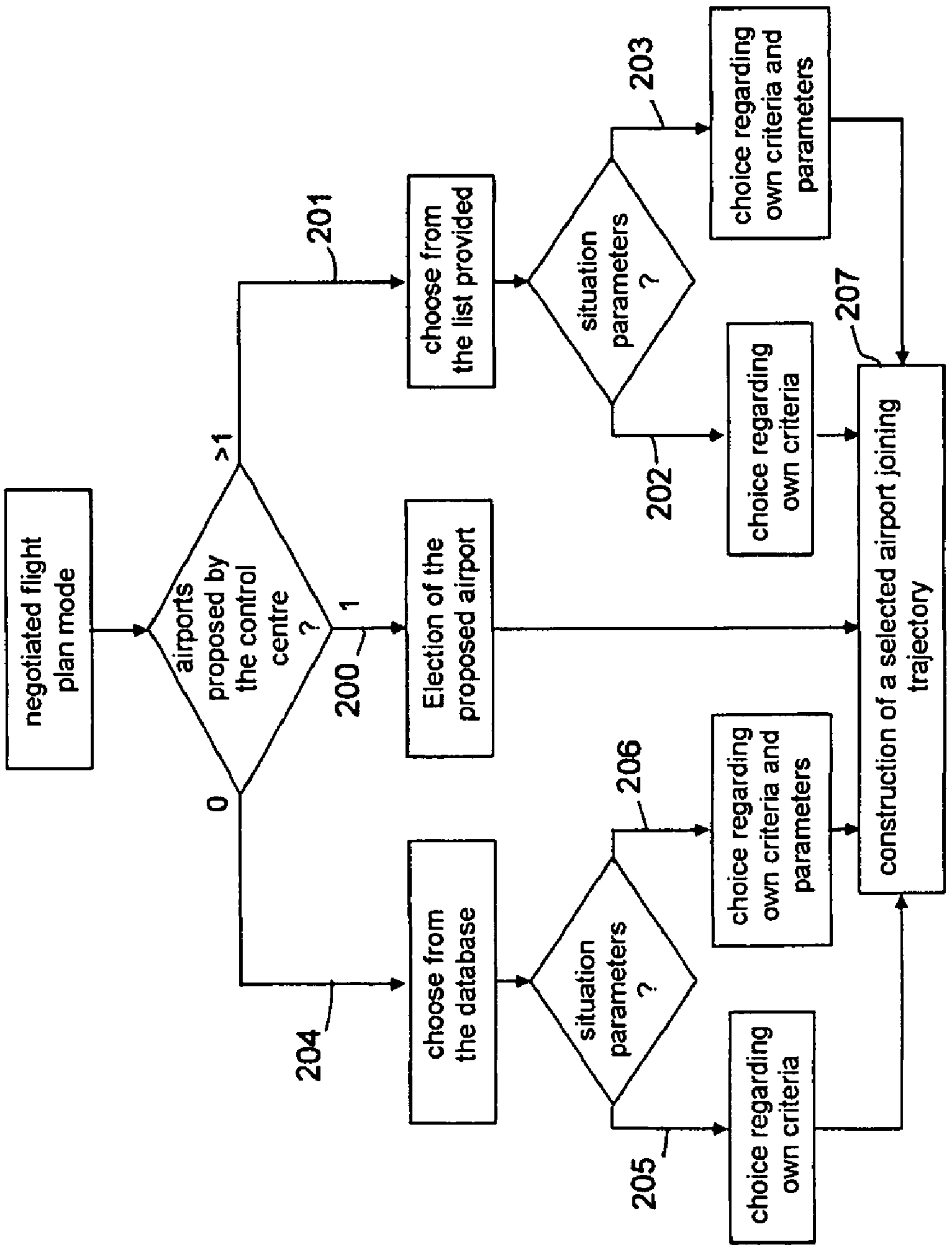

The return to ground automaton 10 activated in its mode of operation for formulating the negotiated modifications of the flight plan operates in accordance with the chart of FIG. 3. It begins by selecting from the airports and approach procedures database 30, the air traffic ground control centers within link range of the aircraft's current position provided by the onboard navigation systems 22 as well as the airports which agree to an emergency landing and which are accessible to the aircraft given its residual capacity. Then it seeks to contact one of the selected air traffic control centers. Various cases can then arise when choosing the rerouting airport.

It may happen that no air traffic control center responds or that the air traffic control center contacted for the rerouting either imposes a determined airport and a determined approach procedure, or proposes a choice of several airports and approach procedures, or else proposes nothing at all.

When, as shown at 200, the air traffic ground control center imposes a determined airport and a determined approach procedure for the rerouting, they are adopted by the return to ground automaton 10 which passes at 207 to the formulation of the modifications of the flight plan making it possible to reach the rerouting airport selected by the chosen approach procedure.

When, as shown at 201, the air traffic ground control center proposes a choice of several airports and approach procedures for the rerouting, the return to ground automaton 10 confines itself to this choice in which it selects an airport-approach procedure pair, either, as shown at 202, on the basis of its own airplane, airports and flight conditions criteria when the triggering system 40 is not provided with an EASS automatic situation monitoring device, or, as shown at 203, on the basis of its own airplane, airports, flight condition criteria and of situation parameters provided by an EASS automatic situation monitoring device when such a device is present in the triggering system 40. It then passes at 207 to the formulation of the modifications of the flight plan making it possible to reach the rerouting airport selected by the chosen approach procedure.

When, as shown at 204, the air traffic ground control center does not propose any airport and approach procedure for the rerouting, the return to ground automaton 10 selects an airport-approach procedure pair from the airports and approach procedures database 30, either, as shown at 205, on the basis of its own airplane, airports and flight conditions criteria when the triggering system 40 is not provided with an EASS automatic situation monitoring device, or, as shown at 206, on the basis of its own airplane, airports, flight condition criteria and of situation parameters provided by an EASS automatic situation monitoring device when such a device is present in the triggering system 40. It thereafter passes, as in the previous cases, to the formulation at 207, of the modifications of the flight plan making it possible to reach the rerouting airport selected by the chosen approach procedure.

When it is activated in its mode of operation of non-negotiated formulation of the modifications of the flight plan, the return to ground automaton 10 undertakes by itself, the search for an airport and for the approach procedure most propitious to the rerouting without seeking to consult an air traffic ground control center. Accordingly, it adopts the same behavior as in the mode of negotiated formulation of the modifications of the flight plan when it does not receive any rerouting airport proposal on the part of an air traffic control center. It selects an airport-approach procedure pair from the airports and approach procedures database 30, either, as was shown at 205 in FIG. 3, on the basis of its own airplane, airports and flight conditions criteria when the triggering system 40 is not provided with an EASS automatic situation monitoring device, or, as was shown at 206 in FIG. 3, on the basis of its own airplane, airports, flight condition criteria and of situation parameters provided by an EASS automatic situation monitoring device when such a device is present in the triggering system 40. It thereafter passes, as in the previous cases, to the formulation at 207, of the modifications of the flight plan making it possible to reach the rerouting airport selected by the chosen approach procedure.

The return to ground automaton 10 formulates the modifications of the flight plan on the basis of the rerouting airport selected and of the waypoints and flight constraints imposed by the chosen approach procedure. Accordingly, it defines, firstly, a so-called diversion waypoint marking the position where the aircraft will leave its current flight plan so as to reach the waypoints imposed by the chosen approach procedure. In the case of a negotiated modification, the diversion waypoint is chosen after a flight time corresponding to a time estimated to be normal when negotiating with an air traffic control authority, for example, 10 minutes.

Secondly, the return to ground automaton 10 deletes from the flight plan thus modified, the discontinuities and the manual segments such as the ARINC 424 segments of VM type (heading to be maintained without termination), FM type (route to be maintained from a fixed point without termination), HM type (standby airfield around a fixed point with undetermined duration).

Thirdly, it verifies that the segment joining the diversion waypoint to the first waypoint of the approach procedure selected satisfies the altitude safety margins in relation to the relief and creates, as required, on this segment, intermediate waypoints with altitude constraints making it possible to comply with these margins.

Fourthly, it verifies that the length of an ARINC 424 segment of XF type the diversion waypoint at the first waypoint of the chosen approach procedure is sufficient to allow the aircraft to enable itself to comply with the flight constraints imposed by the approach procedure at the level of its first imposed waypoint. In fact, this segment is very often a descent segment during which the aircraft passes from a cruising altitude to an altitude close to the ground and it involves verifying that the aircraft is able to dissipate its potential and kinetic energies so as to take a correct approach speed. If this is not the case, the return to ground automaton adds one or more airfield laps around a fixed point (ARINC 424 segment of HM type but of determined duration).

Once these verificatory checks have been satisfied, the return to ground automaton 10 implements these modifications of the flight plan if it is in the non-negotiated flight plan modification mode.

If it is in the negotiated modification mode, the return to ground automaton 10 proposes these modifications of the flight plan to the regional air traffic ground control center responsible for the airport selected, by way of specialized digital messaging termed CPDLC (acronym of the expression: "Controller Pilot Data Link Communications") ensuring within ACARS or ATN aeronautical telecommunication networks the communications between air traffic ground controllers and aircraft by exchanges of messages in the agreed forms (standardized) for the static part of the modifications (location and altitude of the waypoints, flight constraints at the waypoints, etc.) and/or by ADS (acronym of the expression: "Automatic Dependent Surveillance") which is an automatic system for exchanging position and movement information between aircraft deploying in close vicinity or between an aircraft and a ground control station, for the static and dynamic parts (predictions of altitude, speed, arrival time, etc.).

To contact the regional air traffic control center responsible for the rerouting airport selected, the return to ground automaton 10 searches through the airports and approach procedures database 30 for the frequencies to be contacted and the procedure for establishing a link and then implements them. The procedure for establishing a link advantageously comprises an authentication step guaranteeing to the return to ground automaton 10 that it is indeed dealing with a genuine air traffic control authority but this is not indispensable since the return to ground automaton 10 performs a verificatory check of the ability of the modifications of the flight plan which are returned to it to resolve the onboard situation.

In response to a proposal for flight plan modifications received from the return to ground automaton 10, the air traffic control station contacted returns its proposal for flight plan modifications, which proposal may be either identical, or different from that submitted to it by the return to ground automaton 10. The return to ground automaton 10 compares the proposal for flight plan modifications which is returned to it with its initial proposal. If the two proposals are identical, it implements them. If they differ, it takes into consideration the maximum of changes requested by the air traffic control station contacted that are compatible with its airplane, airports, flight conditions criteria and with the situation parameters originating from optional EASS equipment and commences a second round of negotiation. If after a certain number of exchanges, for example 3 or, if no response reaches it within a certain period, the return to ground automaton 10 implements the latest flight plan modifications formulated onboard.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. An autonomous flight method for aircraft characterized, for an onboard automation having taken command of the flight controls with a view to a rerouting, comprising the steps of:

formulating a proposal for flight plan modifications to be performed autonomously for the rerouting, from a diversion waypoint marking a position reached in the flight plan currently in progress after an arbitrary period reserved for negotiation with an air traffic control authority in the region overflown, automatically negotiating by telecommunication the proposal for flight plan modifications with the control authority, when the flight plan modifications are not returned by the control authority in the negotiation period, implementing autonomously the proposal for flight plan modifications, when the flight plan modifications are returned by the control authority if the flight plan modifications returned are identical to the proposal for flight plan modifications, implementing them autonomously, if the flight plan modifications returned differ from the proposal for flight plan modifications, analyzing their consistency as regards the rules defining an onboard strategy, if the flight plan modifications returned are consistent with the rules defining the onboard strategy, implementing them autonomously in place of the proposal for flight plan modifications, if the flight plan modifications returned exhibit inconsistencies with respect to the rules defining the onboard strategy, making a new proposal for flight plan modifications which take into account the elements of the flight plan modifications returned which satisfy the rules defining the onboard strategy, and undertaking a new negotiation, as soon as the negotiation period has elapsed, implementing autonomously the latest, proposal made onboard for flight plan modifications.

2. The method as claimed in claim 1, furthermore comprising an intermediate step including, when the flight plan modifications are not returned by a control authority or disagreement persists after the period of negotiation with the control authority, placing the aircraft on a standby airfield and in seeking, during an arbitrary period to make oneself reliant on a guardian, aircraft or ground station approved for this kind of guardianship.

3. The method as claimed in claim 1, wherein, when the flight plan modifications are aimed at a landing on a rerouting airport, the proposal for flight plan modifications made by the automaton includes, after having determined the rerouting airport and the approach procedure to be followed so as to land on one of its landing runways, in supplementing the series of waypoints associated with flight constraints of the approach procedure with one or more joining segments starting from the diversion waypoint crossed under the local conditions of the flight plan in force so as to reach the first waypoint of the approach procedure while complying with the locally imposed flight constraints.

4. The method as claimed in claim 3, wherein, when the control authority proposes a rerouting airport and the approach procedure for reaching it, the automaton adopts them as the airport to be reached and the approach procedure to be followed.

5. The method as claimed in claim 3, wherein, when the control authority proposes several rerouting airports and approach procedures, the automaton selects an airport and an approach procedure from among the rerouting airports and approach procedures proposed by the control authority based on its own criteria relating to the aircraft, to the airports and to the flight conditions.

6. The method as claimed in claim 3, wherein, when the control authority does not propose any rerouting airports, the automaton selects an airport and an approach procedure from among rerouting airports and approach procedures catalogued in a database on the basis of its own criteria relating to the aircraft, to the airports and to the flight conditions and which, in respect of the airports, rely on information stored in the database.

7. The method as claimed in claim 3, wherein the joining segment or segments are composed of an ARINC 424 segment of XF type making it possible to reach the access point while complying with optional local heading or route constraints, supplemented with an ARINC 424 segment of HM type, for airfield, with the number of laps necessary in order to dissipate the energy while cutting the altitude.

8. The method as claimed in claim 1, wherein the negotiation with the control authority involves an authentication procedure guaranteeing that the flight plan modifications returned originate from an air traffic control center.

9. The method as claimed in claim 3, wherein, figuring among the rules defining the onboard strategy is the necessity for the flight plan modifications returned during negotiation, by a control authority to satisfy:

the possibility for the automaton to follow the corresponding route while complying with imposed maneuverability limitations of the aircraft, the selection of a non-prohibited landing runway and of a valid approach procedure, compliance with the safety altitudes throughout the journey to be traveled, compliance with a minimum length compatible with the necessary adjustment of the kinetic and potential energies at the access point of a landing field approach procedure, compliance with a maximum length compatible with the fuel consumption and the travel time, and the selection of all the landing aid means available on the chosen landing runway.

10. The method as claimed in claim 9, wherein, among the limitations imposed on the maneuverability of the aircraft figuring in the rules defining the onboard strategy, some relate to vertical and lateral accelerations below the detectability threshold of human beings.

* * * * *